United States Patent
Zhang

(10) Patent No.: US 10,397,918 B2
(45) Date of Patent: Aug. 27, 2019

(54) RESOURCE ALLOCATION METHOD, BASE STATION, AND COMMUNICATIONS SYSTEM

(71) Applicant: Huawei Technologies Co., Ltd., Shenzhen (CN)

(72) Inventor: Min Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 33 days.

(21) Appl. No.: 15/796,280

(22) Filed: Oct. 27, 2017

(65) Prior Publication Data

US 2018/0063840 A1   Mar. 1, 2018

Related U.S. Application Data

(63) Continuation of application No. PCT/CN2016/070650, filed on Jan. 12, 2016.

(30) Foreign Application Priority Data

Apr. 28, 2015   (CN) .......................... 2015 1 0209921

(51) Int. Cl.
*H04W 72/04* (2009.01)
*H04L 5/00* (2006.01)
(Continued)

(52) U.S. Cl.
CPC ....... *H04W 72/0446* (2013.01); *H04L 5/0053* (2013.01); *H04L 5/0055* (2013.01);
(Continued)

(58) Field of Classification Search
CPC ......... H04W 72/0446; H04W 72/0413; H04W 72/04; H04W 88/12; H04W 88/02; H04L 5/0094; H04L 5/0053; H04L 5/0055
See application file for complete search history.

(56) References Cited

U.S. PATENT DOCUMENTS

2012/0287877 A1* 11/2012 Han ..................... H04W 74/002
   370/329
2013/0142161 A1*  6/2013 Lee ........................ H04L 5/001
   370/329
(Continued)

FOREIGN PATENT DOCUMENTS

| CN | 101651986 A | 2/2010 |
|---|---|---|
| CN | 102404092 A | 4/2012 |

(Continued)

*Primary Examiner* — Steven H Nguyen
(74) *Attorney, Agent, or Firm* — Leydig, Voit & Mayer, Ltd.

(57) ABSTRACT

Embodiments of the present disclosure disclose a resource allocation method, a base station, and a communications system. The method in the embodiments of the present disclosure includes: when a physical uplink control channel PUCCH format 2x resource needs to be allocated to user equipment UE, obtaining a multiplexing degree of a format 2x resource block RB in a current cell to which the UE belongs, determining a format 2x RB with a lowest multiplexing degree in the current cell, and when multiple format 2x RBs in the current cell have the lowest multiplexing degree, selecting one of the format 2x RBs; and allocating, to the UE, a PUCCH format 2x resource on the selected format 2x RB with the lowest multiplexing degree. The embodiments of the present disclosure ensure even UE multiplexing degrees of different format 2x RBs, reduce intersymbol interference on a PUCCH format 2x resource, and improve PUCCH demodulation performance.

6 Claims, 3 Drawing Sheets

(51) Int. Cl.
 *H04W 88/02* (2009.01)
 *H04W 88/12* (2009.01)

(52) U.S. Cl.
 CPC ........... *H04L 5/0094* (2013.01); *H04W 72/04* (2013.01); *H04W 72/0413* (2013.01); *H04W 88/02* (2013.01); *H04W 88/12* (2013.01)

(56) References Cited

U.S. PATENT DOCUMENTS

| | | |
|---|---|---|
| 2013/0156003 A1 | 6/2013 | Liang et al. |
| 2013/0329678 A1* | 12/2013 | Pan ................. H04L 1/1635 370/329 |
| 2014/0177527 A1 | 6/2014 | Lee et al. |
| 2015/0110050 A1* | 4/2015 | Guo ................. H04L 5/0057 370/329 |

FOREIGN PATENT DOCUMENTS

| | | |
|---|---|---|
| CN | 102624549 A | 8/2012 |
| CN | 103442442 A | 12/2013 |
| CN | 104159309 A | 11/2014 |
| CN | 104284424 A | 1/2015 |
| CN | 104853438 A | 8/2015 |
| EP | 2736296 A1 | 5/2014 |
| WO | 2012019445 A1 | 2/2012 |

* cited by examiner

RESOURCE ALLOCATION METHOD, BASE STATION, AND COMMUNICATIONS SYSTEM

CROSS-REFERENCE TO RELATED APPLICATIONS

This application is a continuation of International Application No. PCT/CN2016/070650, filed on Jan. 12, 2016, which claims priority to Chinese Patent Application No. 201510209921.3, filed on Apr. 28, 2015. The disclosures of the aforementioned applications are hereby incorporated by reference in their entireties.

TECHNICAL FIELD

The present disclosure relates to the field of communications technologies, and in particular, to a resource allocation method, a base station, and a communications system.

BACKGROUND

In a long term evolution (LTE) system, user equipment (UE) sends uplink control information (UCI) to a base station eNodeB by using a physical uplink control channel (PUCCH). The UCI includes a scheduling request indicator (SRI), a hybrid automatic repeat request-acknowledgment (HARQ-ACK), and channel state information (CSI). The SRI is used to indicate that the UE applies for an uplink resource. After receiving the indicator, the base station allocates a PUSCH resource to the UE. The HARQ-ACK is used to indicate a decoding result of downlink transmission. The CSI is used to feed back information related to downlink channel quality.

Currently, a PUCCH resource is allocated by an eNodeB to UE. The eNodeB allocates a resource index to each UE, to determine a resource that can be used by the UE. With reference to a system information block type 2 (System information block type 2, SIB2) message delivered by a cell, the resource index allocated to the UE may be specifically mapped onto a resource block (RB). If the allocated PUCCH resource is a periodic channel quality indicator (CQI) and a SRI, the eNodeB further allocates a config index to each UE, to determine which subframe and which period are used by the UE to occupy a corresponding PUCCH resource, so as to ensure that the UE and another UE are multiplexed on a same PUCCH resource and uplink bandwidth of an LTE system is shared.

Currently, in an existing resource allocation manner, an RB that is on a PUCCH resource and that is nearest to an edge of a frequency band is usually allocated first. A sequence in which the eNodeB allocates a format 2x resource can be summarized as "time division→code division→frequency division". Specifically, after first selecting the first available resource index (cqi-PUCCH-Resource Index) on a format 2x RB near to the edge of the frequency band, the eNodeB sequentially allocates, to different UEs, all cqi-pmi-config indexes (cqi-pmi-Config Index) corresponding to the resource index, and preferentially finds out whether an appropriate timeslot resource (that is, a cqi-pmi-config index) that can be used by the UE exists on an occupied resource index. When allocating a resource to the UE, if the eNodeB finds that no appropriate timeslot resource that can be used by the UE exists on all occupied resource indexes (for example, all the cqi-pmi-config indexes corresponding to the resource index have been allocated by the eNodeB to different UEs), a new resource index should be used. Therefore, when allocating a resource to the UE, the eNodeB selects a timeslot resource on another available resource index on the RB. When the eNodeB allocates a resource to the UE, if all timeslot resources on all available resource indexes on the current format 2x RB have been allocated, the eNodeB uses a resource on a next RB. A manner of allocating a resource on the next RB is the same as a manner of allocating a resource on the previous RB.

In the foregoing solution in which an eNodeB allocates a resource to UE, regardless of a quantity of UEs in a current cell, the eNodeB starts to allocate a resource on an RB that is on a PUCCH resource and that is nearest to an edge of a frequency band. If available PUCCH resources are abundant and a small quantity of UEs exist in the current cell, multiplexing degrees of different RBs in a format 2x are uneven, and even such a case may occur: All resources in the cell allocated to UE are on the first RB (a UE multiplexing degree is high) and no UE is multiplexed on another remaining RB in a format 2x. UCI information of UE is interfered by UCI of another UE that is multiplexed on a same RB in the cell. At a same transmission time interval (TTI), a larger quantity of UEs on RBs with a same multiplexing degree indicates stronger mutual interference. In this case, intersymbol interference on an RB with a high multiplexing degree is relatively strong, demodulation performance of PUCCH format 2x information is relatively poor, CSI reliability is low, and downlink performance of an LTE system is affected.

SUMMARY

Embodiments of the present disclosure provide a resource allocation method, a base station, and a communications system, thereby ensuring even UE multiplexing degrees of different RBs, reducing intersymbol interference on a PUCCH format 2x resource, and improving PUCCH demodulation performance.

A first aspect of the embodiments of the present disclosure provides a resource allocation method, including:

when a physical uplink control channel PUCCH format 2x resource needs to be allocated to user equipment UE, obtaining a multiplexing degree of a format 2x resource block RB in a current cell to which the UE belongs, determining a format 2x RB with a lowest multiplexing degree in the current cell, and when multiple format 2x RBs in the current cell have the lowest multiplexing degree, selecting one of the format 2x RBs, where the multiplexing degree of the format 2x RB is used to identify a quantity of used resource indexes on the format 2x RB; and allocating, to the UE, a PUCCH format 2x resource on the selected format 2x RB with the lowest multiplexing degree.

With reference to the first aspect of the embodiments of the present disclosure, in a first implementation of the first aspect of the embodiments of the present disclosure, the allocating, to the UE, a PUCCH format 2x resource on the selected format 2x RB with the lowest multiplexing degree includes:

determining whether an available PUCCH format 2x resource exists on an occupied resource index on the selected format 2x RB with the lowest multiplexing degree; and if the available PUCCH format 2x resource exists on the occupied resource index on the selected format 2x RB with the lowest multiplexing degree, allocating a PUCCH format 2x resource on the occupied resource index; or if no available PUCCH format 2x resource exists on the occupied resource index on the selected format 2x RB with the lowest multiplexing degree, allocating a PUCCH format 2x resource on an unoccupied resource index on the selected format 2x RB with the lowest multiplexing degree.

With reference to the first aspect or the first implementation of the first aspect of the embodiments of the present disclosure, in a second implementation of the first aspect of the embodiments of the present disclosure, the allocating a PUCCH format 2x resource on an unoccupied resource index on the selected format 2x RB with the lowest multiplexing degree includes:

determining a next unoccupied target resource index according to a predetermined distance interval between resource indexes on the selected format 2x RB with the lowest multiplexing degree, and allocating a PUCCH format 2x resource on the target resource index.

With reference to the second implementation of the first aspect of the embodiments of the present disclosure, in a third implementation of the first aspect of the embodiments of the present disclosure, before the allocating, to the UE, a PUCCH format 2x resource on the selected format 2x RB with the lowest multiplexing degree, the method further includes:

obtaining a maximum quantity $N_{max}$ of UEs that can be multiplexed on each format 2x RB in the cell at one transmission time interval TTI, where $N_{max} \leq 12$; and determining a distance interval between resource indexes on each format 2x RB in the cell according to $N_{max}$.

With reference to the third implementation of the first aspect of the embodiments of the present disclosure, in a fourth implementation of the first aspect of the embodiments of the present disclosure, the determining a distance interval between resource indexes on each format 2x RB in the cell according to $N_{max}$ includes:

when $N_{max} > 6$, determining that a distance interval between resource indexes on a format 2x RB in the cell is 0; or when $N_{max} \leq 6$, determining that a distance interval between resource indexes on a format 2x RB in the cell is $$\left[\frac{12}{N_{max}} - 1\right].$$

A second aspect of the embodiments of the present disclosure provides a base station, including:

a determining unit, configured to: when a physical uplink control channel PUCCH format 2x resource needs to be allocated to user equipment UE, obtain a multiplexing degree of a format 2x RB in a current cell to which the UE belongs, determine a format 2x RB with a lowest multiplexing degree in the current cell, and when multiple format 2x RBs in the current cell have the lowest multiplexing degree, select one of the format 2x RBs, where the multiplexing degree of the format 2x RB is used to identify a quantity of used resource indexes on the format 2x RB; and a resource allocation unit, configured to allocate, to the UE, a PUCCH format 2x resource on the selected format 2x RB with the lowest multiplexing degree.

With reference to the second aspect of the embodiments of the present disclosure, in a first implementation of the second aspect of the embodiments of the present disclosure, the resource allocation unit is specifically configured to: determine whether an available PUCCH format 2x resource exists on an occupied resource index on the selected format 2x RB with the lowest multiplexing degree; and if the available PUCCH format 2x resource exists on the occupied resource index on the selected format 2x RB with the lowest multiplexing degree, allocate a PUCCH format 2x resource on the occupied resource index; or if no available PUCCH format 2x resource exists on the occupied resource index on the selected format 2x RB with the lowest multiplexing degree, allocate a PUCCH format 2x resource on an unoccupied resource index on the selected format 2x RB with the lowest multiplexing degree.

With reference to the second aspect or the first implementation of the second aspect of the embodiments of the present disclosure, in a second implementation of the second aspect of the embodiments of the present disclosure, when allocating the PUCCH format 2x resource on the unoccupied resource index on the selected format 2x RB with the lowest multiplexing degree, the resource allocation unit is specifically configured to: determine a next unoccupied target resource index according to a predetermined distance interval between resource indexes on the selected format 2x RB with the lowest multiplexing degree, and allocate a PUCCH format 2x resource on the target resource index.

With reference to the second implementation of the second aspect of the embodiments of the present disclosure, in a third implementation of the second aspect of the embodiments of the present disclosure, the base station further includes:

a distance interval determining unit, configured to: before allocating, to the UE, the PUCCH format 2x resource on the selected format 2x RB with the lowest multiplexing degree, obtain a maximum quantity $N_{max}$ of UEs that can be multiplexed on each format 2x RB in the cell at one transmission time interval TTI, where $N_{max} \leq 12$; and determine a distance interval between resource indexes on each format 2x RB in the cell according to $N_{max}$.

With reference to the third implementation of the second aspect of the embodiments of the present disclosure, in a fourth implementation of the second aspect of the embodiments of the present disclosure, the distance interval determining unit is specifically configured to: when $N_{max} > 6$, determine that a distance interval between resource indexes on a format 2x RB in the cell is 0; or when $N_{max} \leq 6$, determine that a distance interval between resource indexes on a format 2x RB in the cell is $$\left[\frac{12}{N_{max}} - 1\right].$$

A third aspect of the embodiments of the present disclosure provides a communications system, including UE and the base station according to the second aspect.

It can be learned from the foregoing technical solutions that the embodiments of the present disclosure have the following advantages:

In the embodiments of the present disclosure, when a physical uplink control channel PUCCH format 2x resource needs to be allocated to UE, a multiplexing degree of a format 2x RB in a current cell to which the UE belongs is obtained, a format 2x RB with a lowest multiplexing degree in the current cell is determined, and a PUCCH format 2x resource on a selected format 2x RB with the lowest multiplexing degree is allocated to the UE. In the embodiments of the present disclosure, each time a PUCCH format 2x resource is allocated, a format 2x RB with a lowest multiplexing degree is selected for resource allocation. This ensures even UE multiplexing degrees of different format 2x RBs, reduces intersymbol interference on a format 2x, and improves PUCCH demodulation performance.

DESCRIPTION OF EMBODIMENTS

Figure 1:
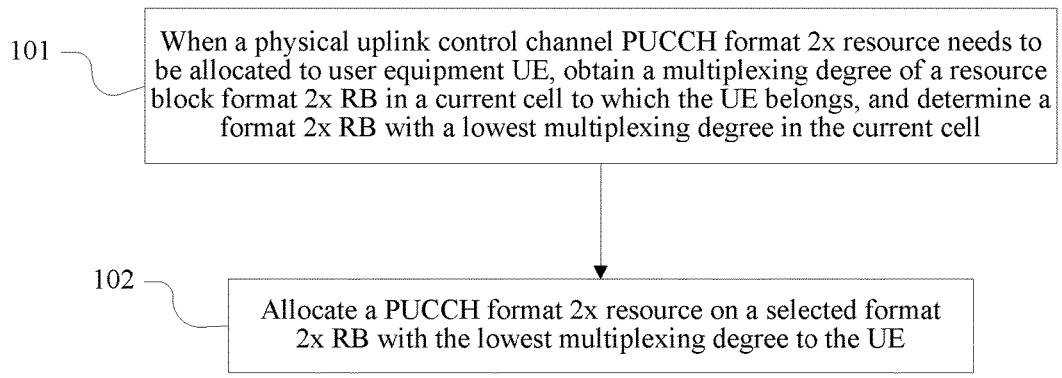
FIG. 1 is a schematic diagram of an embodiment of a resource allocation method according to an embodiment of the present disclosure.

The embodiments of the present disclosure provide a resource allocation method, a base station, and a communications system, thereby ensuring even UE multiplexing degrees of different format 2x RBs, reducing intersymbol interference on a format 2x, and improving PUCCH demodulation performance.

To make a person skilled in the art understand the technical solutions in the present disclosure better, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", and so on (if they exist) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

In an LTE system, user equipment (UE) sends uplink control information (UCI) to a base station eNodeB by using a physical uplink control channel (PUCCH). The UCI includes a scheduling request indicator (SRI), a hybrid automatic repeat request-acknowledgment (HARQ-ACK), and channel state information (CSI). The SRI is used to indicate that the UE applies for an uplink resource. After receiving the indicator, the base station allocates a PUSCH resource to the UE. The HARQ-ACK is used to indicate a decoding result transmitted from downlink. The CSI is used to feed back information related to downlink channel quality.

An LTE protocol defines seven PUCCH formats in three types in total, and information content carried in different PUCCH formats is different. The UE chooses to use a PUCCH format according to information that needs to be transmitted. A first type is a format 1x, including formats: a format 1, a format 1a, and a format 1b, and carrying SRI information or HARQ-ACK information, or SRI information and HARQ-ACK information. A second type is a format 2x, including formats: a format 2, a format 2a, and a format 2b, and carrying CSI or CSI+ACK information. A third type is a format 3, used to carry multi-HARQ-ACK information during carrier aggregation and optional SRI information, and starting to support ACK and CSI multiplexing in R11.

Allocation starts from resource blocks (RB) in the format 2/2a/2b on utmost edges of both ends of a frequency band, next to hybrid RBs (if any), where the hybrid RBs have an RB in the format 2/2a/2b and an RB in the format 1/1a/1b, and then to an RB in the format 1/1a/1b. A sequence of PUCCH resources from the edges of the frequency band to a center is a format 2/2a/2b RB→a hybrid RB→a format 1/1a/1b RB. A location of an RB in the format 3 is not clearly specified in the protocol.

A transmission time interval (TTI) is a parameter on a digital telecommunication network (for example, an LTE system), and indicates that data from a higher layer is compressed into a frame for transmission at a radio link layer. The TTI is duration of independent decoding transmission on a radio link. The TTI is related to a size of a data block from a higher network layer to the radio link layer.

The LTE protocol specifies that 12 cyclic shift sequences exist on one format 2x RB, a maximum of 12 UEs may be multiplexed on one format 2x RB at a same TTI, and the 12 UEs use different cyclic shift sequences on different symbols for code division. To reduce intersymbol interference, in actual use, a maximum quantity $N_{max}$ of UEs that can be multiplexed on one format 2x RB at one TTI is usually limited. That is, a maximum of $N_{max}$ UEs can be multiplexed at one TTI.

The embodiments of the present disclosure are applied to allocating a PUCCH format 2x resource to UE by a base station in an LTE system. That is, the base station allocates, to the UE, a timeslot resource (that is, a cqi-pmi-config index (cqi-pmi-Config Index)) on a resource index (cqi-PUCCH-Resource Index) on an RB.

Referring to FIG. 1, an embodiment of a resource allocation method according to an embodiment of the present disclosure includes the following steps.

101. When a physical uplink control channel PUCCH format 2x resource needs to be allocated to user equipment UE, obtain a multiplexing degree of a format 2x RB in a current cell to which the UE belongs, and determine a format 2x RB with a lowest multiplexing degree in the current cell.

In this embodiment, when a base station receives a Message4 in a random access procedure initiated by the UE, the base station allocates the PUCCH format 2x resource to the UE, obtains the multiplexing degree of the format 2x RB in the current cell to which the UE belongs, and determines the format 2x RB with the lowest multiplexing degree in the current cell.

When multiple format 2x RBs in the current cell have the lowest multiplexing degree, one of the format 2x RBs is selected. For example, when resource allocation is performed for the first time on format 2x RBs in the current cell, multiplexing degrees of the format 2x RBs in the current cell are the same. In this case, any one of the format 2x RBs may be selected as the format 2x RB with the lowest multiplexing degree, or a format 2x RB that ranks first in an allocation sequence may be selected as the format 2x RB with the lowest multiplexing degree. For example, the format 2x RBs in the current cell are numbered as RB0, RB1, RB2, . . . , and the like. When multiple format 2x RBs, for example, RB0 and RB1, have the lowest multiplexing degree in the cell, RB0 may be selected, according to a numbering sequence, as the format 2x RB with the lowest multiplexing degree.

The multiplexing degree of the format 2x RB is used to identify a quantity of used resource indexes on the format 2x RB. Each time a resource index on a PUCCH format 2x RB is newly occupied, a multiplexing degree of the format 2x RB increases by 1.

102. Allocate, to the UE, a PUCCH format 2x resource on a selected format 2x RB with the lowest multiplexing degree.

In this embodiment of the present disclosure, when a physical uplink control channel PUCCH format 2x resource needs to be allocated to UE, a multiplexing degree of a format 2x RB in a current cell to which the UE belongs is obtained, a format 2x RB with a lowest multiplexing degree in the current cell is determined, and a PUCCH format 2x resource on a selected format 2x RB with the lowest multiplexing degree is allocated to the UE. In this embodiment of the present disclosure, each time a PUCCH format 2x resource is allocated, a format 2x RB with a lowest multiplexing degree is selected for resource allocation. This ensures even UE multiplexing degrees of different format 2x RBs, reduces intersymbol interference on a format 2x, and improves PUCCH demodulation performance.

In the embodiment shown in FIG. 1, there are multiple implementations for allocating, to the UE, a PUCCH format 2x resource on the selected format 2x RB with the lowest multiplexing degree. For example, a PUCCH format 2x resource on the selected format 2x RB with the lowest multiplexing degree may be randomly allocated, or a resource on an unoccupied resource index may be allocated. Preferably, when it is determined that an available PUCCH format 2x resource exists on an occupied resource index, the PUCCH format 2x resource on the occupied resource index may be allocated. No limitation is imposed herein.

Figure 2:
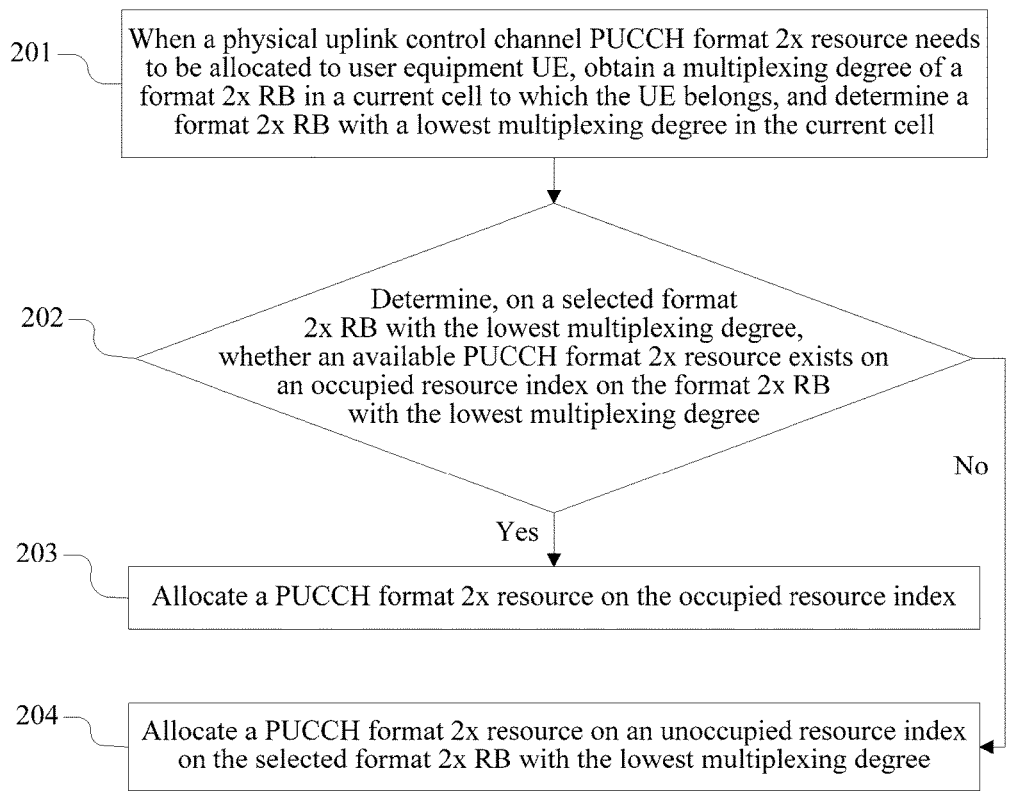
FIG. 2 is a schematic diagram of another embodiment of a resource allocation method according to an embodiment of the present disclosure.
Figure 3:
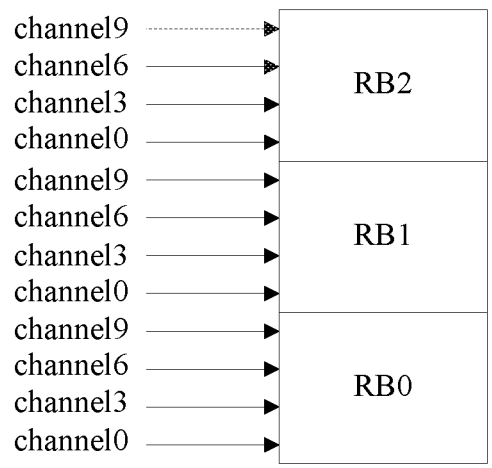
FIG. 3 is a schematic diagram of an embodiment of a resource allocation method for a format 2x RB according to an embodiment of the present disclosure.

The following is described by using a specific embodiment. Referring to FIG. 2, another embodiment of a resource allocation method according to an embodiment of the present disclosure includes the following steps.

201. When a physical uplink control channel PUCCH format 2x resource needs to be allocated to user equipment UE, obtain a multiplexing degree of a format 2x RB in a current cell to which the UE belongs, and determine a format 2x RB with a lowest multiplexing degree in the current cell.

In this embodiment, when a base station receives a Message4 in a random access procedure initiated by the UE, the base station allocates the PUCCH format 2x resource to the UE, obtains the multiplexing degree of the resource block format 2x RB in the current cell to which the UE belongs, and determines the format 2x RB with the lowest multiplexing degree in the current cell.

When multiple format 2x RBs in the current cell have the lowest multiplexing degree, one of the format 2x RBs is selected. For example, when resource allocation is performed for the first time on format 2x RBs in the current cell, multiplexing degrees of the format 2x RBs in the current cell are the same. In this case, any one of the format 2x RBs may be selected as the format 2x RB with the lowest multiplexing degree, or a format 2x RB that ranks first in an allocation sequence may be selected as the format 2x RB with the lowest multiplexing degree. For example, the format 2x RBs in the current cell are numbered as RB0, RB1, RB2, . . . , and the like. When multiple format 2x RBs, for example, RB0 and RB1, have the lowest multiplexing degree in the cell, RB0 may be selected, according to a numbering sequence, as the format 2x RB with the lowest multiplexing degree.

The multiplexing degree of the format 2x RB is used to identify a quantity of used resource indexes on the format 2x RB. Each time a resource index on a PUCCH format 2x RB is newly occupied, a multiplexing degree of the format 2x RB increases by 1.

202. Determine, on a selected format 2x RB with the lowest multiplexing degree, whether an available PUCCH format 2x resource exists on an occupied resource index on the selected format 2x RB with the lowest multiplexing degree; and if the available PUCCH format 2x resource exists on the occupied resource index on the selected format 2x RB with the lowest multiplexing degree, perform step 203; or if no available PUCCH format 2x resource exists on the occupied resource index on the selected format 2x RB with the lowest multiplexing degree, perform step 204.

In this embodiment, the determining whether an available PUCCH format 2x resource exists on an occupied resource index on the selected format 2x RB with the lowest multiplexing degree includes:

determining whether the occupied resource index exists on the selected format 2x RB with the lowest multiplexing degree; and if the occupied resource index exists on the selected format 2x RB with the lowest multiplexing degree, determining whether the available PUCCH format 2x resource exists on the occupied resource index.

When the available PUCCH format 2x resource exists on the occupied resource index, step 203 is performed. When no available PUCCH format 2x resource exists on the occupied resource index, step 204 is performed.

203. Allocate a PUCCH format 2x resource on the occupied resource index.

204. Allocate a PUCCH format 2x resource on an unoccupied resource index on the selected format 2x RB with the lowest multiplexing degree.

In this embodiment, the allocating a PUCCH format 2x resource on an unoccupied resource index on the selected format 2x RB with the lowest multiplexing degree may be: randomly selecting an unoccupied resource index on the unoccupied resource index on the selected format 2x RB with the lowest multiplexing degree, and allocating a PUCCH format 2x resource; or allocating, from the selected format 2x RB with the lowest multiplexing degree, a PUCCH format 2x resource on a resource index with a smallest resource index number according to a pre-marked resource index number of a format 2x RB. No limitation is imposed herein.

In this embodiment, if on the selected format 2x RB with the lowest multiplexing degree, no available PUCCH format 2x resource exists on the occupied resource index and no unoccupied resource index exists, a next format 2x RB with a lowest multiplexing degree is selected for allocation of a PUCCH format 2x resource. For manners of selecting a next format 2x RB with a lowest multiplexing degree for allocation of a PUCCH format 2x resource, refer to step 201.

In this embodiment of the present disclosure, based on the embodiment shown in FIG. 1, all timeslot resources on an occupied resource index on a format 2x RB with a lowest multiplexing degree are preferentially used. If all the timeslot resources on the occupied resource index on the format 2x RB with the lowest multiplexing degree have been allocated, an unoccupied resource index on the format 2x RB with the lowest multiplexing degree is selected for resource allocation, to ensure even multiplexing degrees of different format 2x RBs, and to further reduce CSI information interference.

In the embodiment shown in FIG. 2, to comprehensively consider effective utilization of a frequency domain resource to achieve even UE multiplexing degrees of different format 2x RBs, and reduce interference between UEs simultaneously multiplexed on a format 2x RB, preferably, on a format 2x RB, a distance interval between resource indexes on the format 2x RB may be preset, and a PUCCH format 2x resource may be allocated at an interval. Specifically, the allocating a PUCCH format 2x resource on an unoccupied resource index on the selected format 2x RB with the lowest multiplexing degree may include:

determining a next unoccupied target resource index according to a predetermined distance interval between resource indexes on the selected format 2x RB with the lowest multiplexing degree, and allocating a PUCCH format 2x resource on the target resource index.

Before this basis, a distance interval between resource indexes on the format 2x RB in the cell to which the UE belongs needs to be predetermined. That is, before the PUCCH format 2x resource on the selected format 2x RB with the lowest multiplexing degree is allocated to the UE, the method may further include:

obtaining a maximum quantity $N_{max}$ of UEs that can be multiplexed on each format 2x RB in the cell at one transmission time interval TTI, where $N_{max} \leq 12$; and determining a distance interval between resource indexes on each format 2x RB in the cell according to $N_{max}$.

Further, the determining a distance interval between resource indexes on each format 2x RB in the cell according to $N_{max}$ may include the following:

When $N_{max} > 6$, it is determined that a distance interval between resource indexes on a format 2x RB in the cell is 0. For example, assuming that three format 2x RBs exist in the current cell and a value of a maximum quantity $N_{max}$ of UEs that can be multiplexed on each format 2x RB at one TTI is 7, (channel (chan for short) is used to indicate a resource index on each format 2x RB, and the resource index on each format 2x RB is a integer from 0 to 11), when a resource on a format 2x RB is allocated, an allocation sequence may be considered as
RB0.chan0→RB1.chan0→RB2.chan0→RB0.chan1→
RB1.chan1→RB2.chan1→RB0.chan2→RB1.chan2→
RB2.chan2→RB0.chan3→RB1.chan3→RB2.chan3→
RB0.chan4→RB1.chan4→RB2.chan4→RB0.chan5→
RB1.chan5→RB2.chan5→RB0.chan6→RB1.chan6→
RB2.chan6→RB0.chan7→RB1.chan7→RB2.chan7.

When $N_{max} \leq 6$, it is determined that a distance interval between resource indexes on a format 2x RB in the cell is $$\left[\frac{12}{N_{max}} - 1\right].$$

For example, assuming that three format 2x RBs exist in the current cell and a value of a maximum quantity $N_{max}$ of UEs that can be multiplexed on each format 2x RB at one TTI is 4, (channel (chan for short) is used to indicate a resource index on each format 2x RB, and the resource index on each format 2x RB is a integer from 0 to 11), when a resource on a format 2x RB is allocated, a distance interval between resource indexes is 12/4−1=2, and an allocation sequence may be considered as
RB0.chan0→RB1.chan0→RB2.chan0→RB0.chan3→
RB1.chan3→RB2.chan3→RB0.chan6→RB1.chan6→
RB2.chan6→RB0.chan9→RB1.chan9→RB2.chan9.

It may be understood that, to further reduce time interference between different UEs multiplexed on a same format 2x RB, an allocation sequence may be adjusted for each format 2x RB, and a distance between available resource indexes on the format 2x RB may be increased. Assuming that three format 2x RBs exist in the current cell and a value of a maximum quantity $N_{max}$ of UE that can be multiplexed on each format 2x RB at one TTI is 4, (channel (chan for short) is used to indicate a resource index on each format 2x RB, and the resource index on each format 2x RB is a integer from 0 to 11), when a resource on a format 2x RB is allocated, a distance interval between resource indexes may be N, N is a positive integer greater than $$\left[\frac{12}{N_{max}} - 1\right],$$

and an allocation sequence may be considered as
RB0.chan0→RB1.chan0→RB2.chan0→RB0.chan6→
RB1.chan6→RB2.chan6→RB0.chan3→RB1.chan3→
RB2.chan3→RB0.chan9→RB1.chan9→RB2.chan9.

Figure 4:
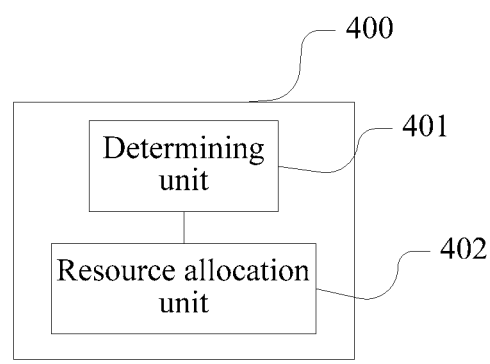
FIG. 4 is a schematic diagram of an embodiment of a base station according to an embodiment of the present disclosure.

The following describes a base station embodiment according to an embodiment of the present disclosure. Referring to FIG. 4, an embodiment of an eNodeB 400 in this embodiment of the present disclosure includes:

a determining unit 401, configured to: when a physical uplink control channel PUCCH format 2x resource needs to be allocated to user equipment UE, obtain a multiplexing degree of a format 2x resource block RB in a current cell to which the UE belongs, determine a format 2x RB with a lowest multiplexing degree in the current cell, and when multiple format 2x RBs in the current cell have the lowest multiplexing degree, select one of the format 2x RBs, where the multiplexing degree of the format 2x RB is used to identify a quantity of used resource indexes on the format 2x RB; and a resource allocation unit 402, configured to allocate, to the UE, a PUCCH format 2x resource on the selected format 2x RB with the lowest multiplexing degree.

Further, the resource allocation unit 402 is specifically configured to: determine whether an available PUCCH format 2x resource exists on an occupied resource index on the selected format 2x RB with the lowest multiplexing degree; and if the available PUCCH format 2x resource exists on the occupied resource index on the selected format 2x RB with the lowest multiplexing degree, allocate a PUCCH format 2x resource on the occupied resource index; or if no available PUCCH format 2x resource exists on the occupied resource index on the selected format 2x RB with the lowest multiplexing degree, allocate a PUCCH format 2x resource on an unoccupied resource index on the selected format 2x RB with the lowest multiplexing degree.

Further, when allocating the PUCCH format 2x resource on the unoccupied resource index on the selected format 2x RB with the lowest multiplexing degree, the resource allocation unit 402 is specifically configured to: determine a next unoccupied target resource index according to a predetermined distance interval between resource indexes on the selected format 2x RB with the lowest multiplexing degree, and allocate a PUCCH format 2x resource on the target resource index.

Further, the base station may further include:
a distance interval determining unit, configured to: before allocating, to the UE, the PUCCH format 2x resource on the selected format 2x RB with the lowest multiplexing degree, obtain a maximum quantity $N_{max}$ of UEs that can be multiplexed on each format 2x RB in the cell at one transmission time interval TTI, where $N_{max} \leq 12$; and determine a distance interval between resource indexes on each format 2x RB in the cell according to $N_{max}$.

Further, the distance interval determining unit may be further specifically configured to: when $N_{max} > 6$, determine that a distance interval between resource indexes on a format 2x RB in the cell is 0; or when $N_{max} \leq 6$, determine that a distance interval between resource indexes on a format 2x RB in the cell is $$\left[\frac{12}{N_{max}} - 1\right].$$

Figure 5:
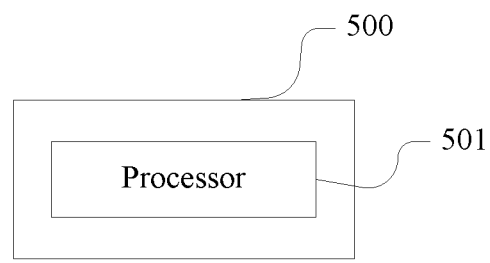
FIG. 5 is a schematic diagram of another embodiment of a base station according to an embodiment of the present disclosure.

The foregoing describes a base station in the embodiment of the present disclosure from a modular function entity perspective. The following describes a base station in an embodiment of the present disclosure from a hardware processing perspective. Referring to FIG. 5, the base station 500 in this embodiment of the present disclosure includes a processor 501 (there may be one or more processors).

The processor 501 is configured to: when a physical uplink control channel PUCCH format 2x resource needs to be allocated to user equipment UE, obtain a multiplexing degree of a format 2x resource block RB in a current cell to which the UE belongs, determine a format 2x RB with a lowest multiplexing degree in the current cell, and when multiple format 2x RBs in the current cell have the lowest multiplexing degree, select one of the format 2x RBs, where the multiplexing degree of the format 2x RB is used to identify a quantity of used resource indexes on the format 2x RB; and allocate, to the UE, a PUCCH format 2x resource on the selected format 2x RB with the lowest multiplexing degree.

Optionally, the processor 501 is specifically configured to: determine whether an available PUCCH format 2x resource exists on an occupied resource index on the selected format 2x RB with the lowest multiplexing degree; and if the available PUCCH format 2x resource exists on the occupied resource index on the selected format 2x RB with the lowest multiplexing degree, allocate a PUCCH format 2x resource on the occupied resource index; or if no available PUCCH format 2x resource exists on the occupied resource index on the selected format 2x RB with the lowest multiplexing degree, allocate a PUCCH format 2x resource on an unoccupied resource index on the selected format 2x RB with the lowest multiplexing degree.

Optionally, when allocating the PUCCH format 2x resource on the unoccupied resource index on the selected format 2x RB with the lowest multiplexing degree, the processor 501 is specifically configured to: determine a next unoccupied target resource index according to a predetermined distance interval between resource indexes on the selected format 2x RB with the lowest multiplexing degree, and allocate a PUCCH format 2x resource on the target resource index.

Optionally, the processor 501 is further configured to: before allocating, to the UE, the PUCCH format 2x resource on the selected format 2x RB with the lowest multiplexing degree, obtain a maximum quantity $N_{max}$ of UEs that can be multiplexed on each format 2x RB in the cell at one transmission time interval TTI, where $N_{max} \leq 12$; and determine a distance interval between resource indexes on each format 2x RB in the cell according to $N_{max}$.

Optionally, the processor 501 may further be specifically configured to: when $N_{max} > 6$, determine that a distance interval between resource indexes on a format 2x RB in the cell is 0; or when $N_{max} \leq 6$, determine that a distance interval between resource indexes on a format 2x RB in the cell is $$\left[\frac{12}{N_{max}} - 1\right].$$

Figure 6:
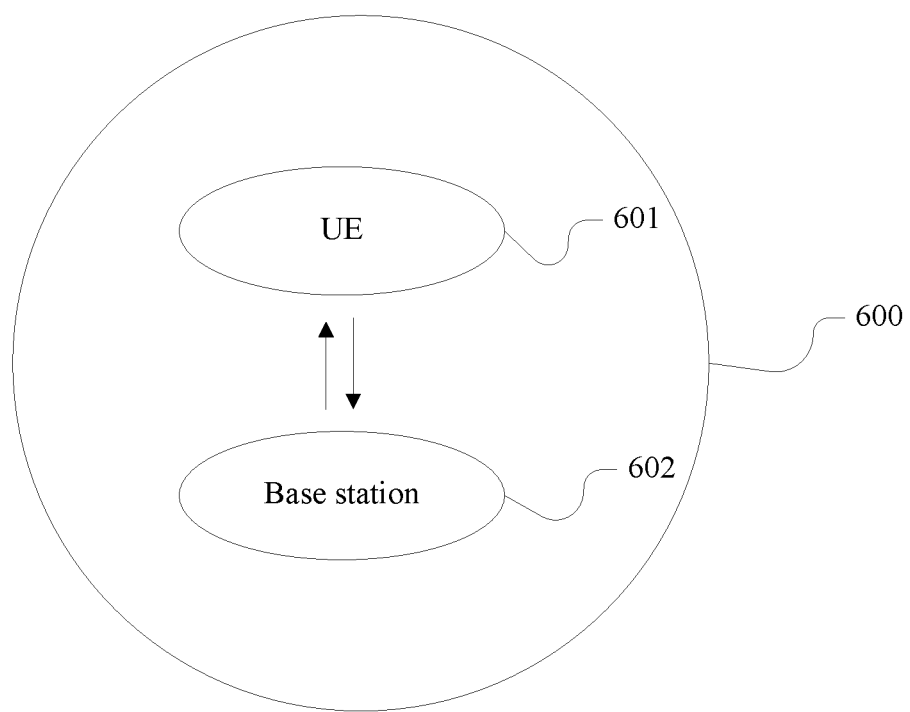
FIG. 6 is a schematic diagram of an embodiment of a communications system according to an embodiment of the present disclosure.

The following describes a communications system embodiment according to an embodiment of the present disclosure. Referring to FIG. 6, an embodiment of a communications system 600 in this embodiment of the present disclosure includes:

user equipment UE 601 and the base station 602 according to the embodiment shown in FIG. 4.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A resource allocation method, comprising:
when a physical uplink control channel (PUCCH) format 2x resource needs to be allocated to a user equipment (UE), obtaining a multiplexing degree value of a format 2x resource block (RB) in a current cell to which the UE belongs, selecting a format 2x RB with a lowest multiplexing degree value in the current cell, and when multiple format 2x RBs in the current cell have the lowest multiplexing degree value, selecting one of the multiple format 2x RBs, wherein the multiplexing degree value of the format 2x RB identifies a quantity of used resource indexes on the format 2x RB, wherein the PUCCH format 2x includes a format 2, a format 2a and a format 2b; and
allocating, to the UE, a PUCCH format 2x resource on the selected format 2x RB with the lowest multiplexing degree value, by:
determining whether an available PUCCH format 2x resource exists on an occupied resource index on the selected format 2x RB with the lowest multiplexing degree value; and
when the available PUCCH format 2x resource exists on the occupied resource index on the selected format 2x RB with the lowest multiplexing degree value, allocating a PUCCH format 2x resource on the occupied resource index; and
when no available PUCCH format 2x resource exists on the occupied resource index on the selected format 2x RB with the lowest multiplexing degree value, allocating a PUCCH format 2x resource on an unoccupied resource index on the selected format 2x RB with the lowest multiplexing degree value, by determining a next unoccupied target resource index according to a predetermined distance interval between resource indexes on the selected format 2x RB with the lowest multiplexing degree value, and allocating a PUCCH format 2x resource on the target resource index.

2. The method according to claim 1, wherein before the allocating, to the UE, a PUCCH format 2x resource on the selected format 2x RB with the lowest multiplexing degree value, the method further comprises:
obtaining a maximum quantity $N_{max}$ of UEs that can be multiplexed on each format 2x RB in the cell at one transmission time interval (TTI), wherein $N_{max} \leq 12$; and
determining a distance interval between resource indexes on each format 2x RB in the cell according to $N_{max}$.

3. The method according to claim 2, wherein the determining a distance interval between resource indexes on each format 2x RB in the cell according to $N_{max}$ comprises:
when $N_{max} > 6$, determining that a distance interval between resource indexes on a format 2x RB in the cell is 0; or when $N_{max} \leq 6$, determining that a distance interval between resource indexes on a format 2x RB in the cell is $$\left[ \frac{12}{N_{max}} - 1 \right].$$

4. A base station, comprising:
a determining unit, configured to: when a physical uplink control channel (PUCCH) format 2x resource needs to be allocated to a user equipment (UE), obtain a multiplexing degree value of a format 2x resource block (RB) in a current cell to which the UE belongs, select a format 2x RB with a lowest multiplexing degree value in the current cell, and when multiple format 2x RBs in the current cell have the lowest multiplexing degree value, select one of the multiple format 2x RBs, wherein the multiplexing degree value of the format 2x RB identifies a quantity of used resource indexes on the format 2x RB, wherein the PUCCH format 2x includes a format 2, a format 2a and a format 2b; and
a resource allocation unit, configured to allocate, to the UE, a PUCCH format 2x resource on the selected format 2x RB with the lowest multiplexing degree value, by:
determining whether an available PUCCH format 2x resource exists on an occupied resource index on the selected format 2x RB with the lowest multiplexing degree value; and
when the available PUCCH format 2x resource exists on the occupied resource index on the selected format 2x RB with the lowest multiplexing degree value, allocating a PUCCH format 2x resource on the occupied resource index; and
when no available PUCCH format 2x resource exists on the occupied resource index on the selected format 2x RB with the lowest multiplexing degree value, allocating a PUCCH format 2x resource on an unoccupied resource index on the selected format 2x RB with the lowest multiplexing degree value, wherein when allocating the PUCCH format 2x resource on the unoccupied resource index on the selected format 2x RB with the lowest multiplexing degree value, the resource allocation unit is configured to: determine a next unoccupied target resource index according to a predetermined distance interval between resource indexes on the selected format 2x RB with the lowest multiplexing degree value, and allocate a PUCCH format 2x resource on the target resource index.

5. The base station according to claim 4, wherein the base station further comprises:
a distance interval determining unit, configured to: before allocating, to the UE, the PUCCH format 2x resource on the selected format 2x RB with the lowest multiplexing degree value, obtain a maximum quantity $N_{max}$ of UEs that can be multiplexed on each format 2x RB in the cell at one transmission time interval (TTI), wherein $N_{max} \leq 12$; and determine a distance interval between resource indexes on each format 2x RB in the cell according to $N_{max}$.

6. The base station according to claim 5, wherein
the distance interval determining unit is configured to:
when $N_{max} > 6$, determine that a distance interval between resource indexes on a format 2x RB in the cell is 0; or when $N_{max} \leq 6$, determine that a distance interval between resource indexes on a format 2x RB in the cell is $$\left[\frac{12}{N_{max}} - 1\right].$$

* * * * *